US009113153B2

(12) United States Patent
Gallagher et al.

(10) Patent No.: US 9,113,153 B2
(45) Date of Patent: Aug. 18, 2015

(54) DETERMINING A STEREO IMAGE FROM VIDEO

(75) Inventors: Andrew Charles Gallagher, Fairport, NY (US); Jiebo Luo, Pittsford, NY (US); Majid Rabbani, Pittsford, NY (US)

(73) Assignee: KODAK ALARIS INC., Rochester, NY (US)

( * ) Notice: Subject to any disclaimer, the term of this patent is extended or adjusted under 35 U.S.C. 154(b) by 1094 days.

(21) Appl. No.: 13/006,674

(22) Filed: Jan. 14, 2011

(65) Prior Publication Data

US 2012/0182391 A1 Jul. 19, 2012

(51) Int. Cl.
*H04N 13/02* (2006.01)

(52) U.S. Cl.
CPC ......... *H04N 13/0221* (2013.01); *H04N 13/021* (2013.01)

(58) Field of Classification Search
USPC .......................................................... 348/46
See application file for complete search history.

(56) References Cited

U.S. PATENT DOCUMENTS

| | | | |
|---|---|---|---|
| 6,847,733 B2 | 1/2005 | Savakis et al. | |
| 7,102,686 B1 | 9/2006 | Orimoto et al. | |
| 7,643,657 B2 | 1/2010 | Dufaux et al. | |
| 7,778,469 B2 | 8/2010 | Cooper et al. | |
| 2002/0191841 A1* | 12/2002 | Harman | 382/154 |
| 2003/0152263 A1* | 8/2003 | Kawano et al. | 382/154 |
| 2003/0161399 A1* | 8/2003 | Ali | 375/240.08 |
| 2007/0263924 A1* | 11/2007 | Kochi et al. | 382/154 |
| 2008/0218611 A1 | 9/2008 | Parulski et al. | |
| 2009/0180682 A1* | 7/2009 | Camus | 382/154 |
| 2009/0268014 A1* | 10/2009 | Holliman | 348/46 |
| 2010/0303340 A1* | 12/2010 | Abraham et al. | 382/154 |
| 2011/0025825 A1 | 2/2011 | McNamer | |
| 2011/0304693 A1 | 12/2011 | Border | |

FOREIGN PATENT DOCUMENTS

WO 2011/014420 2/2011

OTHER PUBLICATIONS

Guttmann et al, Semi-automatic stereo extraction from video footage, Proc. of the 2009 IEEE International Conf. on Computer Vision.
Hoiem et al, Automatic Photo Pop-up, Proc. of the 2005 IEEE International Conf. on Computer Vision.
Sivic et al, Video Google: A Text Retrieval Approach to Object Matching in Videos, Proc. of the 2003 IEEE International Conf. on Computer Vision.
Ratakonda, Real-Time Digital Video Stabilization for Multi-Media Applications, Proc. of the 1998 IEEE International Conf. on Computer and Systems.
Shotton et al, TextonBoost: Joint Appearance, Shape and Context Modeling for Multi-Class Object Recognition and Segmentation, Proc. of the 2006 European Conf. on Computer Vision.

\* cited by examiner

*Primary Examiner* — Andy Rao
*Assistant Examiner* — Jared Walker
(74) *Attorney, Agent, or Firm* — Hogan Lovells US LLP

(57) ABSTRACT

A method of producing a stereo image from a digital video includes receiving a digital video including a plurality of digital images captured by an image capture device; and using a processor to produce stereo suitability scores for at least two digital images from the plurality of digital images. The method further includes selecting a stereo candidate image based on the stereo suitability scores; producing a stereo image from the selected stereo candidate image wherein the stereo image includes the stereo candidate image and an associated stereo companion image based on the plurality of digital images from the digital video; and storing the stereo image whereby the stereo image can be presented for viewing by a user.

7 Claims, 7 Drawing Sheets

DETERMINING A STEREO IMAGE FROM VIDEO

FIELD OF THE INVENTION

The present invention relates digital image and video processing, and particularly to a method for determining a set of one or more stereo images from a video.

BACKGROUND OF THE INVENTION

Stereo and multi-view imaging has a long and rich history stretching back to the early days of photography. Stereo cameras employ multiple lenses to capture two images, typically from points of view that are horizontally displaced, to represent the scene from two different points of view. Such multiple images are displayed to a human viewer to let the viewer experience an impression of 3D. The human visual system then merges information from the pair of different images to achieve the perception of depth.

Stereo cameras can come in any number of configurations. For example, a lens and a sensor unit are attached to a port on a traditional single-view digital camera to enable the camera to capture two images from slightly different points of view, as described in U.S. Pat. No. 7,102,686. In this configuration, the lenses and sensors of each unit are similar and enable the interchangeability of parts. Other cameras contain two or more lenses are described, such as in U.S. Patent Application Publication 2008/0218611, where a camera has two lenses and sensors and an improved image (with respect to sharpness, for example) is produced.

In another line of teaching, there are situations where a stereo image (or video) is desired, but only a single-view image (or video) has been captured. This problem is known as 2D-to-3D conversion, and has been addressed in the art. For example, M. Guttmann, L. Wolf, and D. Cohen-Or. Semi-automatic stereo extraction from video footage. In *Proceedings of the* 2009 *IEEE International Conference on Computer Vision*, teaches a semi-automatic approach (using user input with scribbles) for converting each image of the video to stereo. In other work, such as D. Hoiem et al, Automatic Photo Pop-up, *Proceedings of the* 2005 *IEEE International Conference on Computer Vision*, show that, the 3D geometry of an image is estimated and used to produce images that represent what the scene might look like from another viewpoint.

In another line of teaching, certain frames called keyframes are extracted from a video and used to represent the video. In U.S. Pat. No. 7,643,657, interesting keyframes are selected based on finding shot boundaries and considering other features such as spatial activity and skin detection. However, keyframe extraction does not provide a method for representing a video with a stereo image.

SUMMARY OF THE INVENTION

In accordance with the present invention, there is provided a method of producing a stereo image from a digital video, comprising:

(a) receiving a digital video including a plurality of digital images captured by an image capture device;

(b) using a processor to produce stereo suitability scores for at least two digital images from the plurality of digital images;

(c) selecting a stereo candidate image based on the stereo suitability scores;

(d) producing a stereo image from the selected stereo candidate image wherein the stereo image includes the stereo candidate image and an associated stereo companion image based on the plurality of digital images from the digital video; and (e) storing the stereo image whereby the stereo image can be presented for viewing by a user.

An advantage of the present invention is that it produces one or more stereo images from a digital video that is already captured using a typical image capture device such as a camera to convey an impression of the depth of the scene.

DETAILED DESCRIPTION OF THE INVENTION

Figure 1:
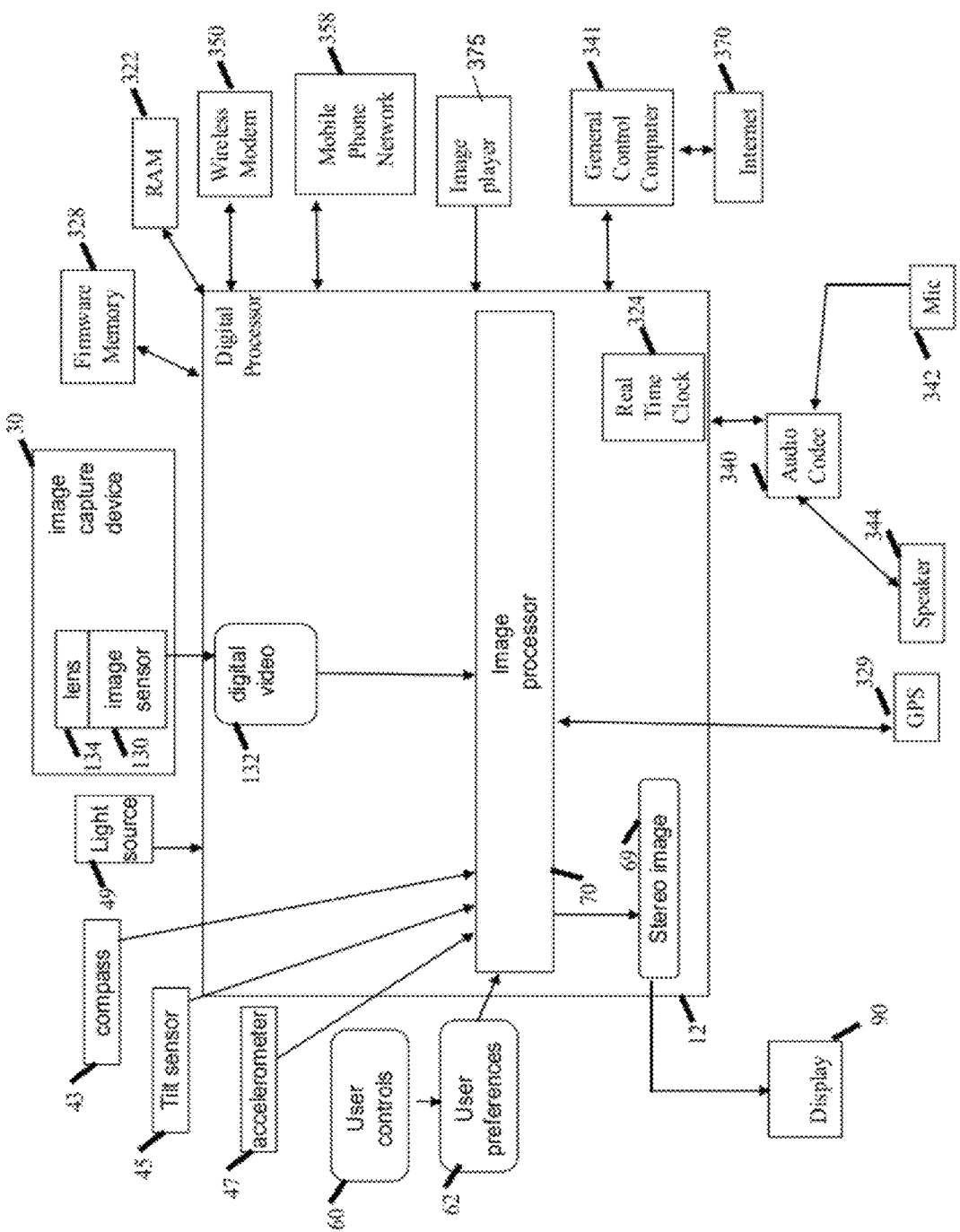
FIG. 1 is a block diagram of an image capture device and processor that can be used to practice the present invention.

FIG. 1 is a block diagram of an image capture device and processing system that are used to implement the present invention. The present invention can also be implemented for use with any type of digital image capture device, such as a digital still camera, camera phone, personal computer, or digital video cameras, or with any system that receives digital images. As such, the invention includes methods and apparatus for both still images and videos. The present invention describes a system that uses an image sensor 130 and lens 134, for capturing an image or video 132.

For convenience of reference, it should be understood that the image or video 132, refer to both still images and videos or collections of images. Further, the images or videos 132 are images that are captured with image sensors 130. The images or videos 132 can also have an associated audio signal. The system of FIG. 1 contains a display 90 for viewing images. The display 90 includes monitors such as LCD, CRT, OLED or plasma monitors, and monitors that project images onto a screen. The sensor arrays of the image sensors 130 can have, for example, 1280 columns×960 rows of pixels. When advisable, the image sensors 130 activate a light source 49, such as a flash, for improved photographic quality in low light conditions.

In some embodiments, the image sensor 130 can also capture and cause a video 132 to be stored. The digital data is stored in a RAM buffer memory 322 and subsequently processed by a digital processor 12 controlled by the firmware stored in firmware memory 328, which is flash EPROM memory. The digital processor 12 includes a real-time clock 324, which keeps the date and time even when the system and digital processor 12 are in their low power state.

The digital processor 12 operates on or provides various image sizes selected by the user or by the system. Images are typically stored as rendered sRGB image data is then JPEG compressed and stored as a JPEG image file in the memory. The JPEG image file will typically use the well-known EXIF (EXchangable Image File Format) image format. This format includes an EXIF application segment that stores particular image metadata using various TIFF tags. Separate TIFF tags are used, for example, to store the date and time the picture was captured, the lens F/# and other camera settings for an image capture device 30, and to store image captions. In particular, the ImageDescription tag is used to store labels. The real-time clock 324 provides a capture date/time value, which is stored as date/time metadata in each EXIF image file. Videos are typically compressed with H.264 and encoded as MPEG4.

In some embodiments, the geographic location is stored with an image captured by the image sensors 130 by using, for example a GPS unit 329. Other methods for determining location can use any of a number of methods for determining the location of the image. For example, the geographic location is determined from the location of nearby cell phone towers or by receiving communications from the well-known Global Positioning Satellites (GPS). The location is preferably stored in units of latitude and longitude. Geographic location from the GPS unit 329 is used in some embodiments to regional preferences or behaviors of the display system.

The graphical user interface displayed on the display 90 is controlled by user controls 60. The user controls 60 can include dedicated push buttons (e.g. a telephone keypad) to dial a phone number; a control to set the mode, a joystick controller that includes 4-way control (up, down, left, and right) and a push-button center "OK" switch, or the like. The user controls 60 are used by a user to indicate user preferences 62 or to select the mode of operation or settings for the digital processor 12 and image capture device 130.

The display system can in some embodiments access a wireless modem 350 and the internet 370 to access images for display 90. The display system is controlled with a general control computer 341. In some embodiments, the system accesses a mobile phone network 358 for permitting human communication via the system, or for permitting signals to travel to or from the display system. An audio codec 340 connected to the digital processor 12 receives an audio signal from a microphone 342 and provides an audio signal to a speaker 344. These components are used both for telephone conversations and to record and playback an audio track, along with a video sequence or still image. The speaker 344 can also be used to inform the user of an incoming phone call. This is done using a standard ring tone stored in firmware memory 328, or by using a custom ring-tone downloaded from the mobile phone network 358 and stored in the memory 322. In addition, a vibration device (not shown) is used to provide a quiet (e.g. non audible) notification of an incoming phone call.

The interface between the display system and the general purpose computer 341 is a wireless interface, such as the well-known Bluetooth® wireless interface or the well-known 802.11b wireless interface. The images or videos 132, 142 are received by the display system via an image player 375 such as a DVD player, a network, with a wired or wireless connection, via the mobile phone network 358, or via the internet 370. It should also be noted that the present invention is implemented in a combination of software and hardware and is not limited to devices that are physically connected or located within the same physical location. The digital processor 12 is coupled to a wireless modem 350, which enables the display system to transmit and receive information via an RF channel. The wireless modem 350 communicates over a radio frequency (e.g. wireless) link with the mobile phone network 358, such as a 3GSM network. The mobile phone network 358 can communicate with a photo service provider, which can store images. These images are accessed via the Internet 370 by other devices, including the general purpose computer 341. The mobile phone network 358 also connects to a standard telephone network (not shown) in order to provide normal telephone service.

Referring again to FIG. 1 the digital processor 12 accesses a set of sensors including a compass 43 (preferably a digital compass), a tilt sensor 45, the GPS unit 329, and an accelerometer 47. Preferably, the accelerometer 47 detects both linear and rotational accelerations for each of three orthogonal directions (for a total of 6 dimensions of input). This information is used to improve the quality of the images using an image processor 70 (by, for example, deconvolution) to produce a stereo image 69, or the information from the sensors is stored as metadata in association with the image. In the preferred embodiment, all of these sensing devices are present, but in some embodiments, one or more of the sensors is absent.

Further, the image processor 70 is applied to the images or videos 132 based on user preferences 62 to produce the stereo image 69 that are shown on the display 90. Further, the image processor 70 can improve the quality of the original images or videos 132 by for example, removing the hand tremor from a video. The display 90 is a standard LCD or OLED display as is well known in the art, or it is a stereo display such as described in U.S. Ser. No. 12/705,652 filed Feb. 15, 2010, entitled "3-Dimensional Display With Preferences". Preferably the display 90 displays the stereo image 69 that is derived from a video 132. The display 90 preferably contains a touch-screen interface that permits a user to control the device, for example, by playing the video when the triangle is touched. Some displays 90 that display stereo images require that the viewer wear special eyeware such as shutter glasses. Other displays 90 are capable of providing a viewer with a unique image for each eye to convey the impression of depth using, for example, barriers or lenticular surfaces (autostereoscopic displays). Even with a standard 2D display 90, stereo images can be effectively shown to a viewer using the anaglyph method, where the viewer wears anaglyph glasses with one red lens and another blue lens and the image is displayed and an anaglyph image produced using the red channel of the left viewpoint image and the blue (and sometimes green) channels of the right viewpoint image.

The present invention is directed towards producing a set of one or more stereo images from a captured video 132. As used herein, a stereo image is an image of a scene containing images of substantially the same scene from at least two different viewpoints. A stereo image can be produced by literally photographing a scene from two different camera positions, or by other methods (e.g. by fixing the position of a camera, and then capturing the scene from one position and then moving the scene and recapturing the scene.) The important aspect of a stereo image is that, relative to the scene, the scene is captured from at least two different points of view. Typically, a stereo image includes a left image and a right image.

Instead of attempting to produce a 3D video from a 2D video, the present invention is directed at finding those image frames in the 2D video for which a good quality alternate viewpoint image of that same scene can either be found or produced. This permits a viewer to experience a 3D perception of the scene captured by the regular 2D video.

Figure 2:
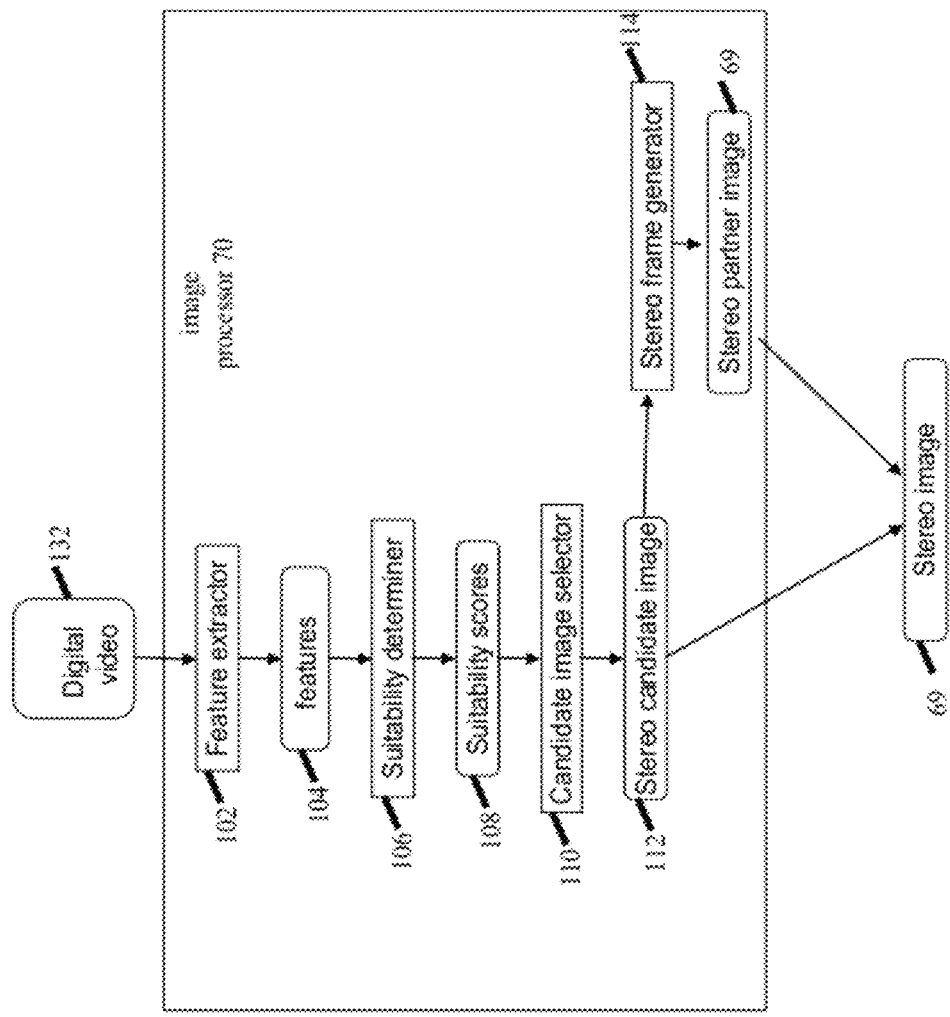
FIG. 2 is a block diagram illustrating the method of the present invention for producing a stereo image from a digital video.

FIG. 2 illustrates the method of the invention in more detail. The image processor 70 receives a digital video 132 and, after processing, produces the stereo image 69 suitable for displaying on a display 90. Broadly speaking, the image processor 70 is directed at first finding stereo candidate images from the digital video that are suitable for producing the stereo image 69 by determining suitability scores for each image from the digital video 132. Then, the stereo image 69 is produced for each suitable image, resulting in the stereo image 69 for each stereo candidate image. The strategy employed by the present invention is to find those images from the digital video 132 that will result in high quality stereo images 69, and then to spend computing resources on those frames, instead of blindly attempting to produce the stereo image 69 for each and every image in the digital video 132.

Figure 3:
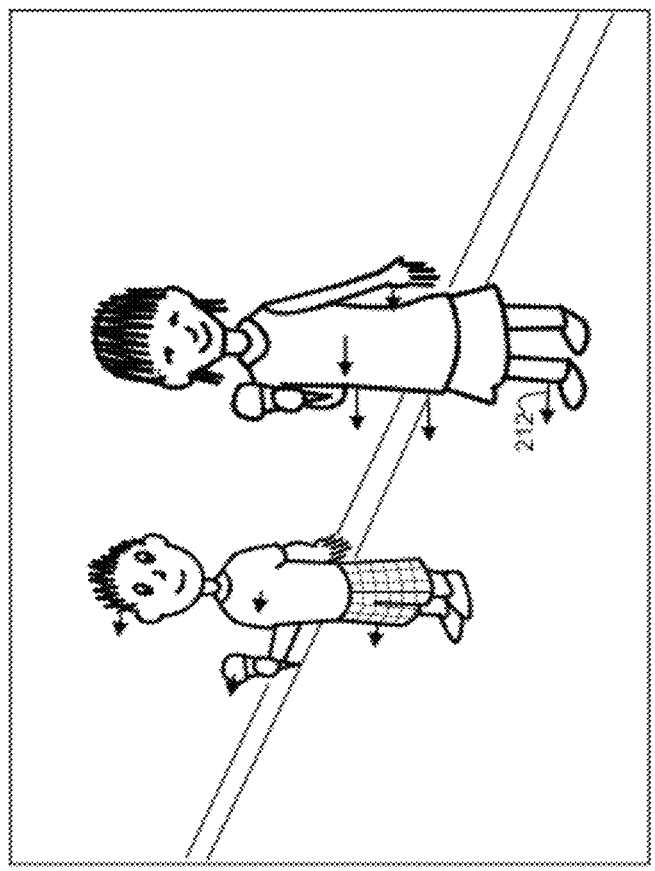
FIG. 3 is an illustration of vectors showing feature point matches between a pair of images overlaid on the first image of a pair of images.

Now, in more detail, the digital video 132 is input to a feature extractor 102 for extracting a set of features 104 from each frame (image) of the digital video 132. Many different features 104 can be computed for an image from a video, such as color histogram, spectrum, or interest points. Assume the digital video 132 contains N images. Preferably, the features for the $n^{th}$ image are found by tracking interest points between frame images n and n+F from the digital video 132, where F is a frame offset (e.g. F=6 means that interest points are tracked between an image from the digital video 132 and the image that occurs 6 frames later, which is about 0.2 seconds later at a typical capture rate of 30 images per second). Note that F can be a negative frame offset to facilitate real-time processing. To compute feature 104, the well known algorithm SIFT (scale invariant feature transform) described by D. G. Lowe, Object recognition from local scale-invariant features. In *Proceedings of the 7th International Conference on Computer Vision* (also U.S. Pat. No. 6,711,293) can be used to detect interest points called SIFT features in two images in the video. Next, the interest points are matched across the two images to establish a correspondence between interest point locations in the left image and the right image, which constitute the stereo image. This matching process is also described in U.S. Pat. No. 6,711,293. The image processor 70 identifies high confidence feature point matches. This is performed by, for example, removing feature point matches that are weak (where the SIFT descriptors between putative matches are less similar than a predetermined threshold), or by enforcing geometric consistency between the matching points, as, for example, is described in Josef Sivic, Andrew Zisserman: Video Google: A Text Retrieval Approach to Object Matching in Videos. *Proceedings of the* 2003 *IEEE International Conference on Computer Vision*: pages 1470-147. By finding matching interest points between the image frames, the motion vectors 212 that track interest points are found. An illustration of the identified feature point matches is shown in FIG. 3 for an example image. A vector 212 indicates the spatial relationship between a feature point in a first image from a digital video 132 to a matching feature point in a second image. In the example, the vectors 212 are overlaid on the left image, and the right image is not shown. The collection of these motion vectors are included in the features 104 for an image and describe both the motion of objects in the scene, and the motion of the camera. In another embodiment, the well known method of optical flow is used to determine at least some of the features 104.

Figure 8:
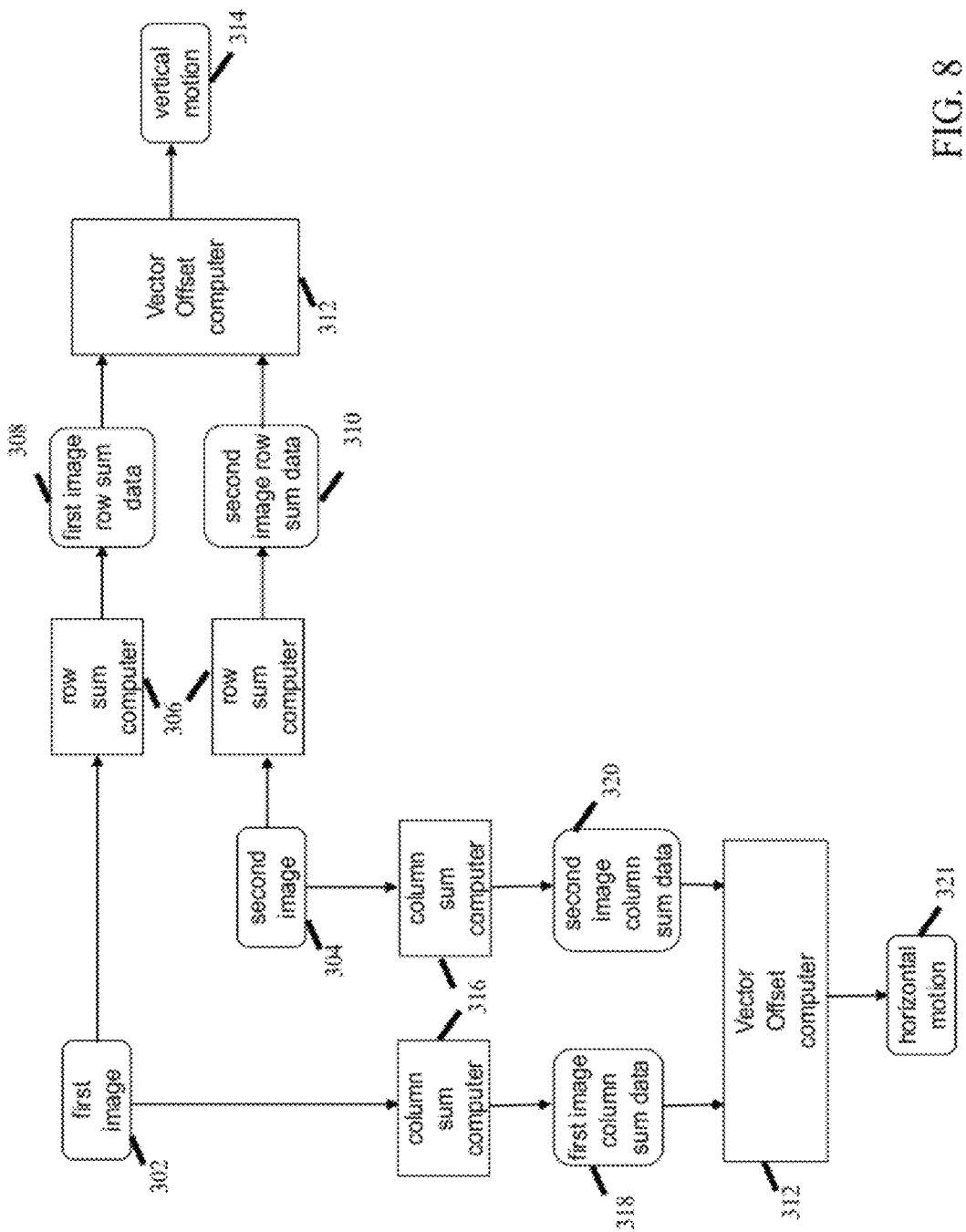
FIG. 8 illustrates a method for estimating features for an image in a digital video related to vertical and horizontal motion.

Further, the features 104 can represent the camera motion between images n and n+F in the digital video 132. One computationally efficient approach for quantifying camera motion is computed by assuming a translational motion model and computing the horizontal and vertical translational motion between each pair of consecutive image frames. This can be performed by using integral projection matching, as described in "Real-Time Digital Video Stabilization for Multi-Media Applications," by Ratakonda, in *Proceedings of the* 1998 *IEEE International Conference on Computer and Systems*. The process is illustrated in FIG. 8. A first image 302 and a second image 304 are the inputs for the integral projection matching algorithm. The first image 302 is input to a row sum computer 306 which computes a vector of first image row sum data 308, that is to say for each row of the first image 302, it computes the sum of all pixel data values in that row. Similarly, the second image 304 is input to a row sum computer 306 which computes a vector of second image row sum data 310. The first image row sum data 308 and second image row sum data 310 are input to a vector offset computer 312, which computes the offset that best matches the two input vectors. Those skilled in the art will recognize that there are many methods by which to find the best matching offset between two vectors, including maximizing cross correlation or minimizing the sum of squared errors. In a preferred embodiment, the best offset is determined by minimizing the sum of absolute errors. The determined best offset represents the vertical motion 314 between the first image 302 and second image 304.

Similar steps are used to determine the horizontal motion between the two images, which come from two frames of the video in the present invention. Specifically, the first image 302 is input to a column sum computer 316 which computes a vector of first image column sum data 318, that is to say for each column of the first image 302, it computes the sum of all pixel data values in that column. Similarly, the second image 304 is input to a column sum computer 316 which computes a vector of second image column sum data 320. The first image column sum data 318 and second image column sum data 320 are input to a vector offset computer 312, which computes the offset that best matches the two input vectors. The determined best offset represents the horizontal motion 321 between the first image 302 and second image 304.

Even further, the features 104 can represent detected objects in the images from the digital video 132 such as faces, grass, trees, sky, people and water. Detecting objects in images is a well known problem with many proposed solutions such as described by J. Shotton et al, TextonBoost: Joint Appearance, Shape and Context Modeling for Multi-Class Object Recognition and Segmentation, in *Proceedings of the* 2006 *European Conference on Computer Vision*.

Figure 4A:
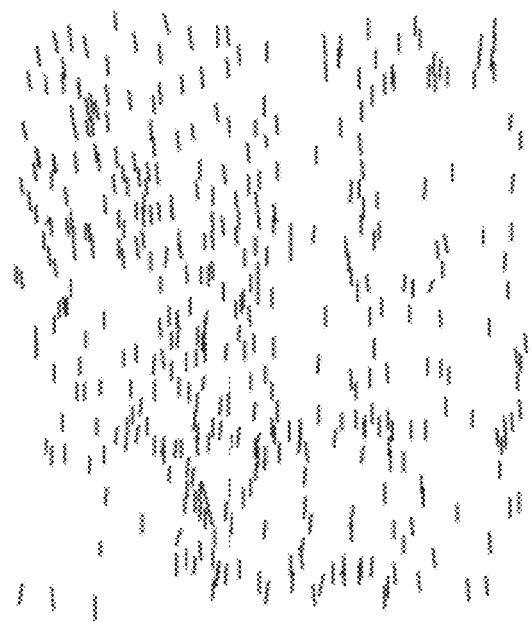
FIG. 4A illustrates vectors showing feature point matches for an image which is suitable for producing a stereo image.
Figure 4B:
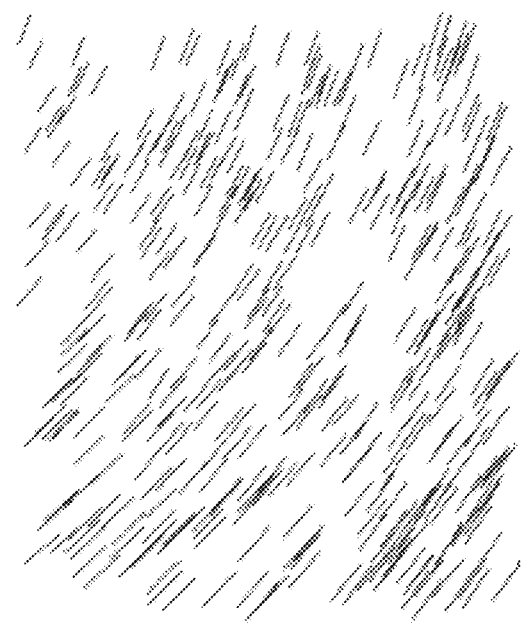
FIG. 4B illustrates vectors showing feature point matches for an image which is less suitable for producing a stereo image.

Briefly reviewing, each of the N images from the digital video 132 has corresponding features 104. Let the features 104 for the $n^{th}$ frame be denoted as $F_n$. Then, a suitability determiner 106 is used to analyze the features 104 to produce a suitability score for at least two (but often more than two or even all) images of the digital video that indicates whether the image is one that would be suitable for using as one image from the multiple views of a scene contained within the stereo image 69. The suitability determiner 106 is a classifier from the art of machine learning and can incorporate any known classification or regression algorithm. The classifier used by the suitability determiner 106 can be trained using standard methods of machine learning with examples of images that are judged to be suitable for producing stereo images 69 (positive examples) and examples of images that are judged to be not suitable for producing stereo images 69 (negative examples). For example, an image which is not good for producing the stereo image 69 is one from a time in the video where many objects are moving in different directions, or where all objects are too far away from the camera. On the other hand, an image which is suitable for producing the stereo image 69 is one that is from a time in the video where the objects in the scene are static and the camera is moving laterally and smoothly parallel to the ground. For example, FIG. 4A shows a visualization of motion vectors 212 (which are included in the features 104) that track feature points from the features 104 where the suitability determiner 106 finds that the image is suitable for producing the stereo image 69. In this case, in the time interval between the images of the digital video 132 were captured, the camera was translated (mostly) laterally parallel to the ground plane. In contrast, FIG. 4B shows a visualization of motion vectors (among the features 104) where the suitability determiner 106 finds that the image is not (or is less) suitable for producing the stereo image 69. In this case, the camera was rotated and translated in a fashion so that creating the stereo image 69 for the image would be more difficult.

The suitability scores 108 are represented as $S_n$ and can range numerically from 0.0 (unsuitably) to 1.0 (highly suitable). The suitability determiner 106 can compute subfeatures from the features 104 for using to compute the suitability scores 108. For example, the subfeatures can include:

a) the mean of all the motion vectors b) the number of motion vectors that are substantially horizontal (e.g. within $\pi/8$ of horizontal)

c) the number of motion vectors that are not substantially horizontal.

d) estimates of the camera motion (i.e. relative camera positions) between the two images (the $n^{th}$ image and the $n+F^{th}$ image). This can be estimated using standard structure from motion approaches.

Figures 5A, 5B, 5C, 5D, 5E:
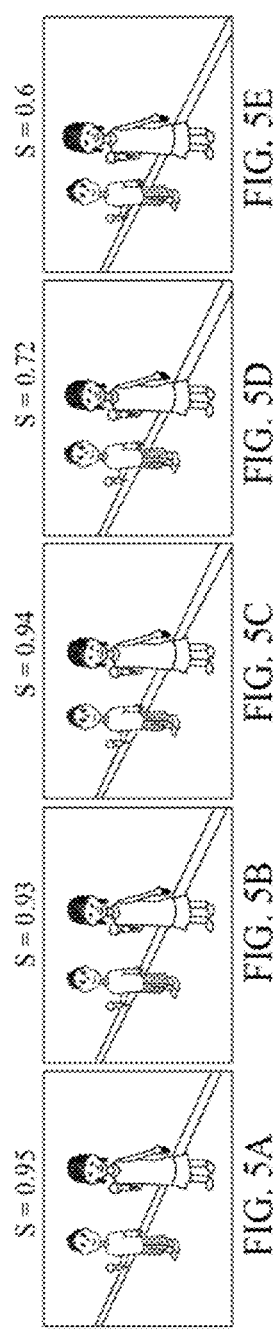
FIGS. 5A-E shows five exemplary images from a digital video and their corresponding suitability scores.

The suitability determiner 106 can be configured (either with manual parameter tuning, or by using machine learning techniques), for example, to assign a high suitability score 108 when the motion vectors are mostly horizontal and mostly have a length similar to a target length to ensure there exists a proper stereo disparity, which is the difference in position between correspondence points in two images of the stereo image 69 (disparity is inversely proportional to scene depth). A low suitability score is assigned otherwise. As an illustrative example, FIGS. 5A-5E show five images from the digital video 132, and their corresponding suitability scores 108, ranging from 0.6 (FIG. 5E) to 0.95 (FIG. 5A).

Figure 6:
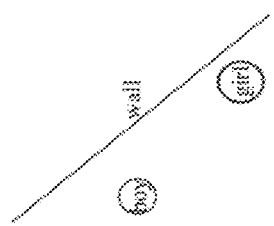
FIG. 6 illustrates the camera positions of the five exemplary images from the digital video relative to the objects in the scene.

The suitability scores 108 are received by a candidate image selector 110 for selecting at least one stereo candidate image 112 from the images from the digital video 132 for using to produce the stereo image 69. In some situations, no images of the digital video 132 will have a suitability score higher than a threshold, so it is possible for no stereo candidate images 112 to be found. Preferably, the number of stereo candidate images 110 is less than the number N. Preferably, the candidate image selector 110 selects stereo candidate images 112 having high suitability scores 108. For example, the image in FIG. 5A is selected as a stereo candidate image 112 because it has the highest suitability score 108 from among the images from the exemplary digital video of FIG. 5. Note that the suitability score 108 can be considered along with other scores (e.g. image appeal as described in U.S. Pat. No. 6,847,733, a score indicating whether a frame should be a keyframe as described in U.S. Pat. No. 7,778,469, a score indicating the likelihood of faces being present in the frame as described in U.S. Pat. No. 6,847,733, or other scores such as manual input from a human viewer indicating frames or segments of the digital video 132 that are of interest). FIG. 5 shows illustrative images from a digital video 132 of a boy (further from the camera) and a girl (closer to the camera) where the camera has translated from left to right. FIG. 6 shows a top view of the scene to illustrate the positions of the boy, girl, wall, and the positions of the camera when the images of the digital video 132 were captured. For the first three images (FIGS. 5A-5C), the camera translated from left to right, which facilitates the production of the stereo image 69. For the final two images (FIGS. 5D and 5E), the camera translates but also proceeds towards the subjects of the scene, which results in zooming of the frames.

When multiple stereo candidate images 112 are determined for a single digital video 132, other considerations beyond the suitability scores 108 are preferably considered, such as the spacing of the stereo candidate images 112 in time. For example, a greedy approach for selecting stereo candidate images 112 is:

1. start with an empty list L of stereo candidate images 112
2. find the image n with the greatest suitability score 108 $S_n$
3. decide if $S_n$ is greater than threshold Tm
4. decide if n is not within Tt of any other stereo candidate image 112
5. if "yes" to questions 3 and 4, add n to the list L. Otherwise, delete n from consideration.
6. repeat 2 to 6 until convergence.

Figure 7:
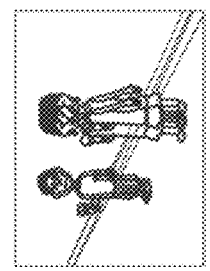
FIG. 7 illustrates a stereo image produced by the present invention.

A stereo frame generator 114 produces a stereo image 69 from each of the stereo candidate images 112 by producing a stereo companion image 67 for the stereo candidate image 112. The stereo image 69 contains at least two images of the scene from different viewpoints, and one of these images is the stereo candidate image 112. Preferably, the stereo image 69 contains two images, where one image is the stereo candidate image 112 and the other image is its stereo companion image 67. In the preferred embodiment, the stereo companion image 67 (i.e. the stereo image that is an image of the scene from another point of view for the stereo candidate image) is the $n+F^{th}$ image from the digital video 132. In another embodiment, the stereo companion image 67 is the image from the digital video 132 that is within a specific number of frames (e.g. within T frames, where T=30) or a specific time interval that also has a desirable camera location (i.e. a horizontally translated camera). In still another embodiment, the stereo companion image 67 of the stereo image 69 is produced by estimating the 3D geometry of the scene from the stereo candidate image and possibly other images from the digital video 132 and then using computer graphic techniques to produce a rendering of what that scene would look like from another point of view. Producing such a rendering of scene based on images of a scene and estimated 3D geometry is described in D. Hoiem et al, Automatic Photo Pop-up, in *Proceedings of the* 2005 *International Conference on Computer Vision* and B. Micusik and J. Kosecka, Multi-view superpixel stereo in urban environments. International Journal of Computer Vision, 89(1):106-119, 2010. Stereo images 69 often must be configured in a specific way depending on the characteristics of the display 90. For example, when the device 90 is a standard (2D) LCD display, the images of the stereo image 69 (the stereo candidate image 112 shown in FIG. 5A, and its determined stereo companion image shown in FIG. 5C) are combined to produce an anaglyph image (illustrated in FIG. 7).

One issue that is encountered when producing the stereo image 69 from two images from the digital video 132 (one the stereo candidate image 112) is that it is necessary to determine which of the two image is the left view (to be presented to the left eye of the viewer and which is the right view (to be presented to the right eye). This can be accomplished using structure from motion algorithms (e.g. such an approach is described in Noah Snavely, Steven M. Seitz, Richard Szeliski, "Photo tourism: Exploring photo collections in 3D," ACM Transactions on Graphics (SIGGRAPH Proceedings), 2006 to determine the camera positions from matched SIFT feature points, and then determining which image corresponds to the left-most camera position when facing the same direction as a camera.

Figure 9:
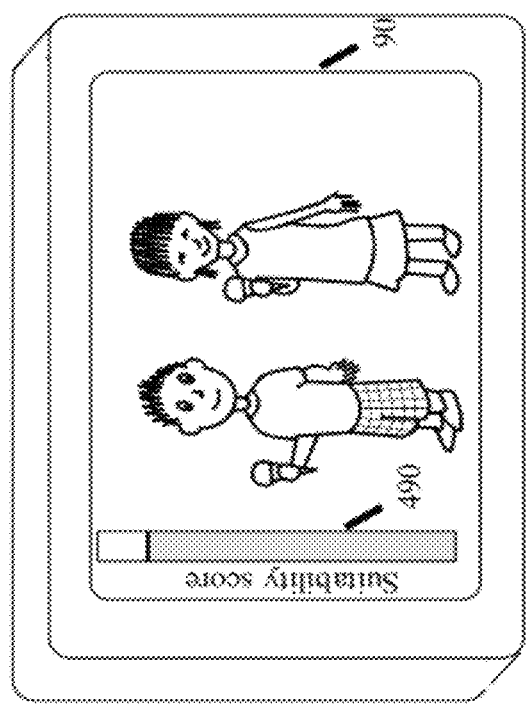
FIG. 9 illustrates an image capture device with a display that shows the suitability score of images from a digital video to aid the human operator at capturing digital videos that are well-suited for producing stereo images.

In a further embodiment, an image capture device (FIG. 1) instructs the human operator on how to capture a digital video 132 in anticipation of producing the stereo image 69. For example, during video capture, it is common for images from the digital video to be displayed on the display 90. Simultaneously, the image processor 70 analyzes the digital video 132 with the method described in FIG. 2, and determines a suitability score 108 for each image of the video (or in some embodiments, every $R^{th}$ image). Then, an indicator of stereo suitability 490 is displayed on the display 90 as shown in FIG. 9. This permits the user to adjust his or her videography style dynamically and results in improved stereo images 69.

The invention has been described in detail with particular reference to certain preferred embodiments thereof, but it will be understood that variations and modifications can be effected within the spirit and scope of the invention.

PARTS LIST 12 digital processor
30 image capture device
43 compass
45 tilt sensor
47 accelerometer
49 light source
60 user controls
62 user preferences
67 stereo companion image
69 stereo image
70 image processor
90 display
102 feature extractor
104 features
106 suitability determiner
108 suitability scores
110 candidate image selector
112 stereo candidate image
114 stereo frame generator
130 image sensor
132 digital video
134 lens
142 image or video
212 motion vector
302 first image
304 second image
306 row sum computer
308 row sum data
310 row sum data
312 vector offset computer
Parts List Cont'd
314 vertical motion
316 column sum computer
318 column sum data
320 column sum data
321 horizontal motion
322 RAM buffer memory
324 real-time clock
328 firmware memory
329 GPS sensor
340 audio codec
341 computer
342 microphone
344 speaker
350 wireless modem
358 phone network
370 internet
375 image player
490 indicator of stereo suitability

The invention claimed is:

1. A method of producing a stereo image from a digital video, comprising:
   (a) receiving a digital video including a plurality of digital images captured by an image capture device;
   (b) using a processor to produce stereo suitability scores for at least two digital images from the plurality of digital images;
   (c) selecting a stereo candidate image based on the stereo suitability scores;
   (d) producing a stereo image from the selected stereo candidate image wherein the stereo image includes the stereo candidate image and an associated stereo companion image based on the plurality of digital images from the digital video; and
   (e) storing the stereo image whereby the stereo image can be presented for viewing by a user,
   wherein features and subfeatures are extracted from the plurality of digital images and used to compute the suitability scores, wherein the subfeatures include the mean of all motion vectors and a number of motion vectors that are substantially horizontal;
   wherein the suitability score associated with a particular digital image from the digital video is based on a combination of detecting camera motion using digital images from the digital video and detecting objects in the particular digital image.

2. The method of claim 1 wherein the suitability score is based on
   detecting camera motion using digital images from the digital video.

3. The method of claim 1 wherein the suitability score associated with a particular digital image from the digital video is based on detecting objects in the particular digital image.

4. The method of claim 1, further including the user selecting at least one stereo image and sharing, storing, printing or displaying the selected stereo image.

5. The method of claim 1, further including producing a print from at least one of the stereo images, wherein the print is an anaglyph image or a lenticular print.

6. The method of claim 2, wherein the step of selecting a subset of digital images includes identifying panning camera motion in the digital video and selecting a stereo candidate image associated with the panning camera motion.

7. The method of claim 1, further including the image capture device instructing a user on how to capture a video in anticipation of producing a stereo image.

* * * * *